Oct. 20, 1936.  C. W. VOGT  2,058,046
BAR CUTTER
Filed Feb. 8, 1934  7 Sheets-Sheet 1

INVENTOR
Clarence W. Vogt
BY
ATTORNEYS

Oct. 20, 1936.  C. W. VOGT  2,058,046
BAR CUTTER
Filed Feb. 8, 1934  7 Sheets-Sheet 3

INVENTOR
Clarence W. Vogt
BY
ATTORNEYS

Oct. 20, 1936.  C. W. VOGT  2,058,046
BAR CUTTER
Filed Feb. 8, 1934  7 Sheets-Sheet 5

INVENTOR
Clarence W. Vogt
BY
ATTORNEYS

Oct. 20, 1936.                C. W. VOGT                2,058,046
                              BAR CUTTER
                         Filed Feb. 8, 1934          7 Sheets-Sheet 6

INVENTOR
Clarence W. Vogt
BY
ATTORNEYS

Patented Oct. 20, 1936

2,058,046

UNITED STATES PATENT OFFICE 2,058,046

BAR CUTTER

Clarence W. Vogt, Louisville, Ky., assignor, by mesne assignments, to Vogt Processes, Incorporated, Louisville, Ky., a corporation of Delaware Application February 8, 1934, Serial No. 710,367

19 Claims. (Cl. 107—20)

My present invention relates to the severance of uniform lengths from a continuously advanced bar or rod and certain features of the invention are particularly applicable to the cutting of bars or rods made up of paper wrapped comestibles, such, for instance, as a filled tube of partially frozen ice cream or the like.

My copending application, Serial No. 628,322, filed Aug. 11, 1932, now Patent No. 2,006,375, issued July 2, 1935, discloses a method and apparatus for continuously forming and sealing a tubular paper wrapper about a continuously extruded stream of a plastic edible substance normally liquid at body temperature. The present invention provides means for cutting such a product into suitable lengths before the product passes to the cold room for final hardening. With my improved cutter the enwrapped plastic substance may be cut into suitable lengths such as long or short bars or short peripherally wrapped individual service portions such as those disclosed in my copending application Serial No. 658,264, filed Feb. 23, 1933, now Patent No. 2,018,750, issued Oct. 29, 1935.

The problem of severing a continuously formed and wrapped bar of this type into uniform lengths presents numerous difficulties due to the plastic nature of the enwrapped material. Any attempt to slice directly through the bar with a heavy cutter or a saw would tear or tend to tear the paper and would also squeeze plastic material out of the tube at the region of the cut.

As the bar itself is being continuously produced and advanced endwise, the cutters must move with the bar as well as transversely thereof during the cutting operation.

Due to the soft character of the material it is not practical to advance the cutter by its engagement with the advancing material unless the cutter be in the form of a broad blade or saw, but the wider the cutter the more material is carried out of the tube by the movement of the cutter through the tube and its soft contents. Furthermore if a high speed disc type of saw or cutter be employed it sets up considerable frictional heat causing a noticeable and obviously objectionable melting of a product such as ice cream.

In accordance with the present invention I have solved this cutting problem by the use of extremely fine saw blades, such as scroll saw blades, and so mount them on carriers which travel forwardly at the same rate as the rate of advance of the bar. Means is provided for moving the fine saw blades and carrier transversely with respect to the bar at the proper time and while rapidly longitudinally reciprocating them. The reciprocatory stroke is quite short in order to minimize the smearing of the surface of the material at the cut. This is particularly important where more than one flavor or color of material is contained in the tube. The short stroke also prevents the blades from drawing the plastic material with them to more than the minimum distance beyond the confines of the tube.

After the severance of a suitable length from the leading end of the continuously formed bar, the length or section thus cut off is moved laterally (vertically by dropping, or horizontally) and during such lateral movement its endwise movement is slightly accelerated so that the section will get slightly ahead of the cutter which has just severed it and its dropping or other lateral movement will take place without the end wiping against the cutter. Preferably this is accomplished by the use of holders which retain and support the bar during cutting and then accelerate the movement of the bar before or during the lateral movement.

As a further feature of the invention I deliver the material to the tube forming mechanism in a sufficiently hardened or stiffened condition that it may be cut into sections as above indicated and the sections may be conveyed to the hardening room, thus avoiding any need for hardening in the tube before cutting into sections.

The invention may be more fully understood from the following description in connection with the accompanying drawings wherein:—

Figure 1:
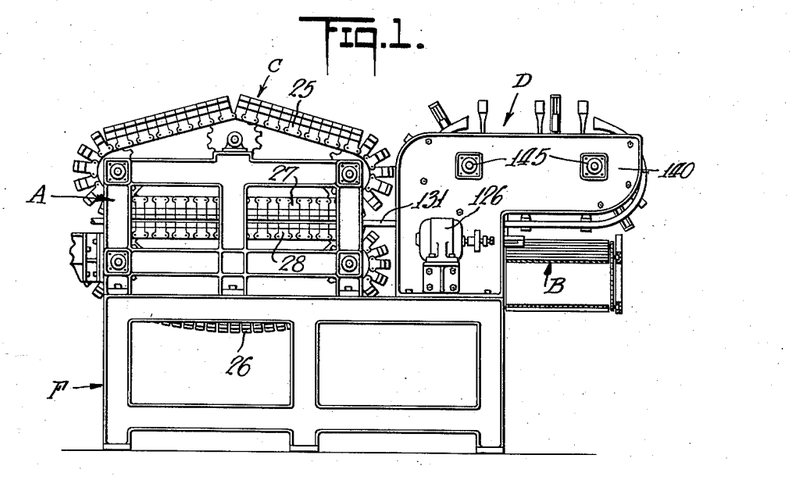
Fig. 1 is a side elevational view of my improved cutter mechanism and a conveyor for continuously feeding the bar of material to be cut.

Referring first to Fig. 1 of the drawings, F designates a main frame structure above which is supported a frame A mounting a conveyor C which delivers the enwrapped plastic bar 131 to a cutter mechanism also mounted on the main frame F and designated generally at D. The cut lengths of enwrapped plastic material are carried off by a conveyor B.

Figure 2:
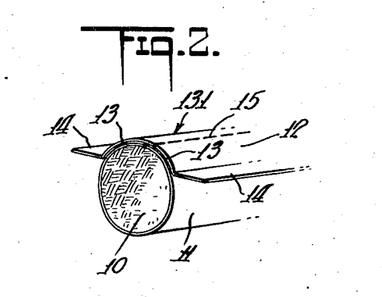
Fig. 2 is a perspective view of a typical enwrapped plastic bar to be severed.
Figure 3:
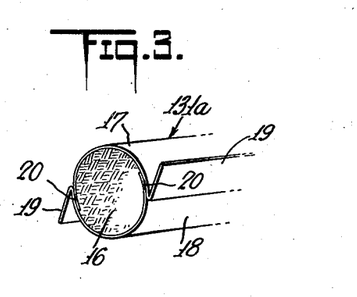
Fig. 3 is a similar view of another type of bar which can be conveniently cut by my improved mechanism.

In Figs. 2 and 3 I have illustrated two types of enwrapped plastic bars, typically paper wrapped, partially frozen ice cream which may be fed to my improved cutter mechanism by the conveyor. Different means or methods for continuously forming such enwrapped bars of plastic material are disclosed in my Patent No. 2,006,375 and my application Serial No. 709,642, filed Feb. 3, 1934, now Patent No. 2,006,376, issued July 2, 1935. The bar 131 of Fig. 2 consists of a cylindrical mass 10 of plastic substance substantially encircled by a paper wrapper strip 11. The edges of this strip are concealed by a sealing strip 12 which is partially wrapped around the tube forming strip 11 and adhesively connected thereto as at 13, the edges of the strip 12 projecting laterally to define flaps or tabs 14. A weakened line 15 provided in the strip 12 between the adhesive areas 13 is adapted to serve as a rupture line when unwrapping individual service portions of ice cream such as may be produced by hardening the enwrapped plastic mass and severing it transversely into suitable lengths.

Another type of bar which may be conveniently handled by my cutting apparatus is shown in Fig. 3. This bar 131a consists of a cylindrical mass of plastic material 16 having a wrapper which consists of two strips 17 and 18, each strip being wrapped around slightly more than half of the bar. One end of each strip is overlapped by the other and one end of each strip is bent at an acute angle to define a flap 19. The overlapped edges of the wrapper forming strips 17 and 18 may be adhesively connected together as at 20.

In conveying the bar 131 or 131a as the case may be, to the cutter mechanism, the conveyor C may conveniently grip the projecting tabs 14 or 19 as the case may be, and advance not only the bar itself but act to pull the strips of wrapping material from the source of supply through a tube forming mechanism and along the filling tube.

Any suitable type of conveyor mechanism may be employed. The particular mechanism indicated in the drawings is that illustrated in my Patent No. 2,006,376, but the details thereof form no portion of the present invention. This conveyor includes two endless chains 25 and 26 of articulated blocks, the lower working run 27 of the upper chain and the upper working run 28 of the lower chain coacting to grasp the tabs of the enwrapped plastic bar and advance this bar to the cutter mechanism. Between the gripping surfaces is proper space for the body of the bar.

The cut-off mechanism indicated generally at D in Fig. 1 and shown more in detail in Figs. 4 to 12 is disposed between a pair of frame plates 140 mounted on the main frame M and include horizontally upper extensions 141. These frames are connected at suitable intervals by cross frame pieces 142, 143, and 144 and they provide bearings 145 for a pair of horizontally disposed shafts 146 and 147 having sprocket wheels 149 and 150 over which a chain 148 travels. The upper run of the chain travels over a track plate 151 mounted on the cross frame pieces 142, 143. The link pivot pins are encircled by rollers 152 which ride on this narrow track.

Figure 5:
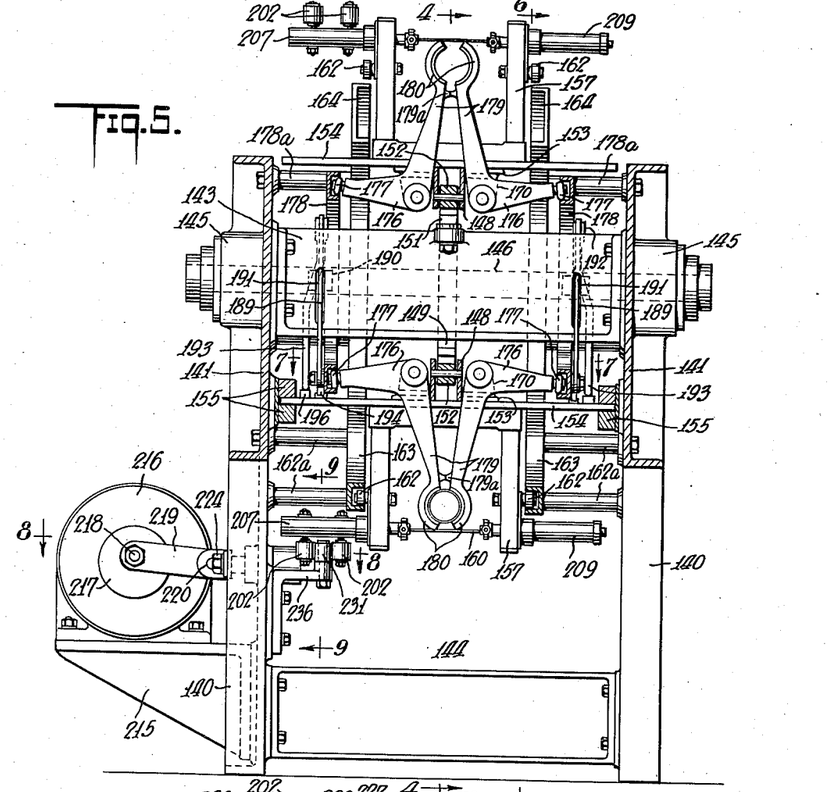
Fig. 5 is a transverse sectional view taken approximately on the staggered line 5—5 of Fig. 4.
Figure 6:
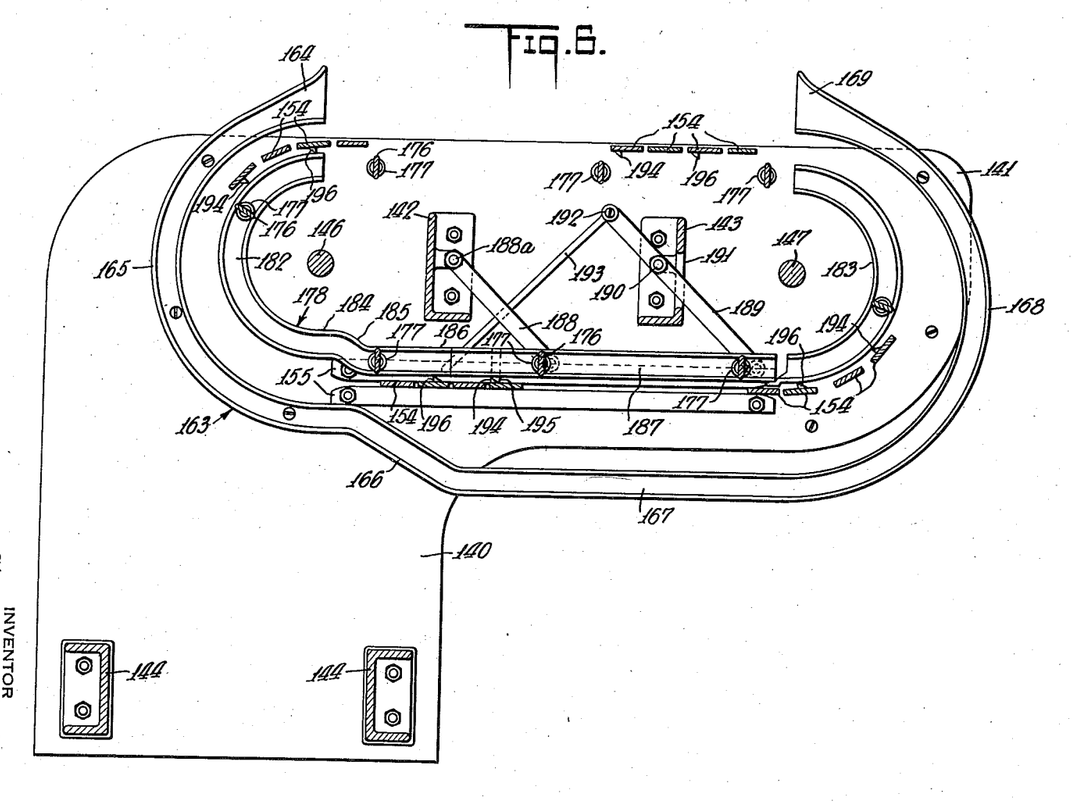
Fig. 6 is another longitudinal sectional view of the mechanism but showing more clearly the arrangement of cam traction, this view being taken on the line 6—6 of Fig. 5.
Figure 10:
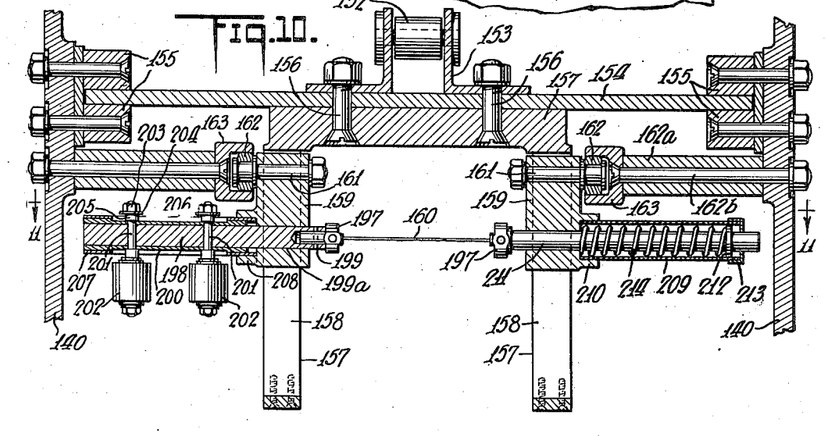
Fig. 10 is a transverse sectional view on the line 10—10 of Fig. 4.

The sprocket wheels are disposed midway of the two side plates 140 and the lower run of the chain is not directly supported but is indirectly supported through the medium of lateral extensions carried by certain of the links which are guided in trackways 155 which are fixed directly to the inner faces of the side plates 140 (Figs. 5, 6, and 10). At suitable intervals along the length of the chain, certain sets of adjacent chain links which may be four in number are attached through L-shaped brackets 153 to horizontally disposed, transversely extending plates or bars 154, the ends of which travel in horizontal channels defined by the pairs of track bars 155 so that the lower run of the sprocket chain is always partially supported at least by the engagement of the ends of those plates in their trackways.

One plate 154, preferably the second plate of each series of four has secured to its under face as by bolts 156, an inverted U-shaped bracket 157 which constitutes a cutter carriage (Fig. 10). The legs of the bracket 157 are longitudinally slotted at 158 to permit vertical sliding movement therein of slide blocks 159 which carry the cutters 160 and the bolts 161 on which are rotatably mounted rollers 162 traveling in a pair of cam tracks 163. The tracks are spaced inwardly from the plates 140 by spacer sleeves 162a encircling the bolts 162b projecting from the plates 140 and carrying the tracks. The tracks act on the rollers 162 to effect the vertical movement of the cutter carrying slides.

Each track 163 (Fig. 6) includes a flared entering mouth 164 arranged above the frame 141, an approximately semi-circular portion 165 following an arc approximately concentric with the sprocket wheel. At the lower end of the curved portion 165 is a downwardly inclined track portion 166 connected to a horizontal portion 167 leading to a second arcuate portion 168 terminating in a flared outlet end 169.

As the rollers 162 ride down the cam portion 166 of the track 163, saws, knives or cutters 160 are moved through the enwrapped plastic bar to cut the latter in two. The cutters are held in their lowermost position as the rollers 162 ride along the portion 167 of the track and then again swing upwardly while following the curved portion 168. The curve 168 is so designed that throughout approximately half its length it constantly approaches the sprocket wheel shaft 147 as a center and thereby draws the cutter carrier slides back toward the main sprocket chain 148.

Figure 7:
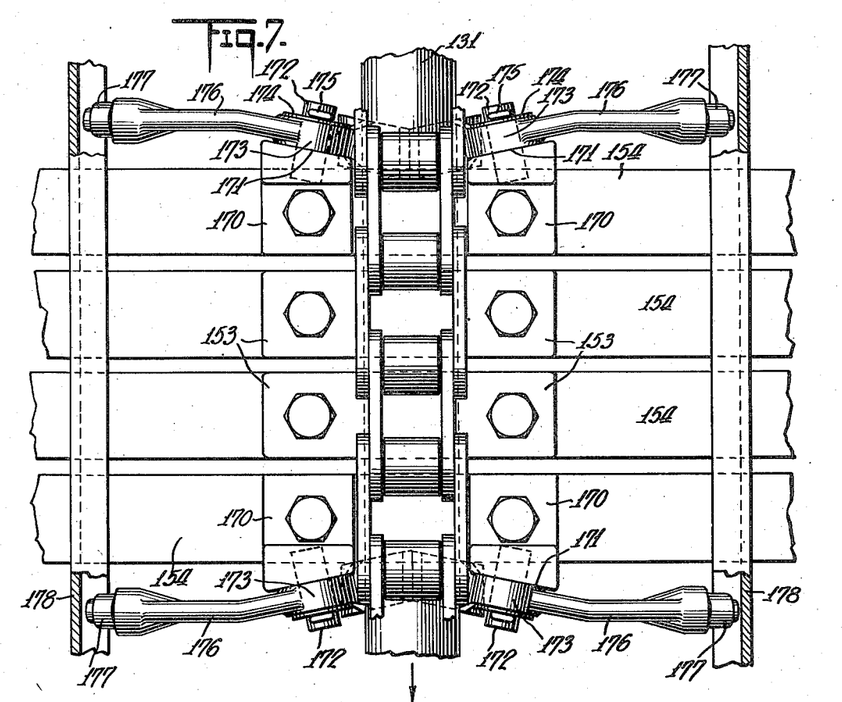
Fig. 7 is an enlarged sectional plan view taken approximately on the line 7—7 of Fig. 5.

Mounted upon its outer face each of the end plates of each set of four has an angular bracket 170 (Figs. 5 and 7). Each bracket has an outer face 171 disposed at right angles to the plane of the support plate 154 and inclined slightly from a plane transverse of the sprocket chain. Projecting at right angles from these faces 171 are pivot pins 172 on which are mounted the hubs or bearings 173 of bell crank levers retained in position by washers 174 and cotter pins 175. Each bell crank is thus free to rock in a plane slightly at an angle to the plane at right angles to the direction of travel of the sprocket chain.

The upper arms 176 of the bell cranks carry rollers 177 at their free ends which travel in channel trackways 178 carried by bolts projecting inwardly from the plate 140 which bolts are encircled by spacer sleeves 178a. The opposite generally vertically disposed arms 179 of the bell cranks terminate in semi-circular bar receiving portions 180. The ends of the two bell cranks may move toward and from each other and when together to an extent limited by the engagement of stops 179a (Fig. 5) on the arms 179, cooperatively define a generally cylindrical support for the bar of enwrapped plastic material. These supports act on the bar to support it preceding and during the cutting of the bar. By having the bell crank pivots set at a slight angle to the plane in which the chain travels the bar supporting parts are slightly accelerated in their forward movement after the bar is cut and as these clamps move toward an open position to release and drop the bar. This acceleration is sufficient to advance the bar far enough ahead of the cutter mechanism so that the trailing end of the bar will not trip against the saw as the bar drops onto a carry off conveyor B (see Fig. 1). This motion will be more fully described hereinafter in conjunction with the description of the operation of the machine.

The track 178 (Fig. 6) in which the rollers 177 of the bell cranks travel, includes two arcuate end portions 182 and 183 concentric with the sprocket wheels. The entering end portion 182 continues as a lower short horizontal run 184 terminating in a downwardly inclined section 185 which acts upon the rollers 177 to effect closing of the holders 180 about the advancing bar. Beyond the inclined portion 185 the trackway has a horizontal portion 186 the major section 187 of which is upwardly displaceable, and beyond the section 187 the track continues in the form of the curved section 183.

At practically all of the time the rollers of two bell cranks are disposed within the displaceable track section 187 (Figs. 4 and 6) and the trailing bell crank lever of one set of plates 154 does not leave this section until after the leading bell crank lever of another set of plates enters said sections. These two bell crank levers support a section cut from the bar as shown in Fig. 15. A displaceable track section may be raised so that the holders 180 which are supporting the cut off section of the bar are simultaneously opened. As an incident of such opening, the component of forward motion induced by the angular setting of the bell crank pivot pins, comes into play carrying a section forwardly so that it may clear the cutter 160 as it falls onto the conveyor 181.

The means to effect raising of the displaceable track sections 187 and to insure positive lowering of the latter in the event that they fail to return by gravity includes a pair of links 188 (Figs. 6 and 12) pivotally connected at their upper ends at 188a to the cross piece 142 and pivotally connected at their lower ends to the track sections 187. A pair of levers 189 parallel to links 188 have their lower ends pivotally connected to track sections 187 and are fulcrumed intermediate their ends on pivots 190 carried by cross bar 143, the bar being slotted at 191 to provide clearance for movement of levers 189. The upper end of at least one lever 189 is pivoted at 192 to a push bar 193.

Figure 12:
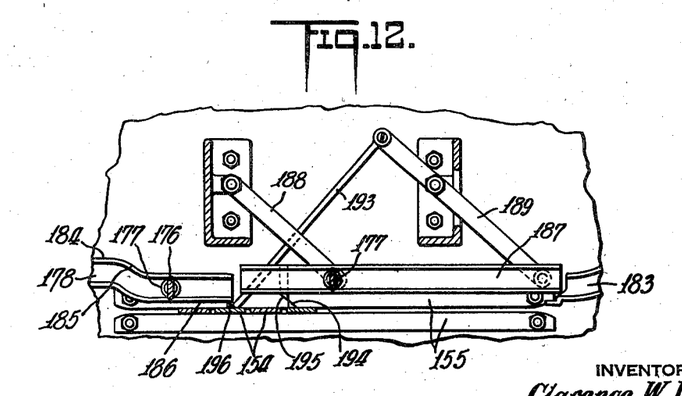
Fig. 12 is a fragmentary longitudinal sectional detail corresponding to Fig. 6 but showing the operation of the emergency restoring device for the clamp-actuating kicker.

The leading plate 154 of each set carries cams 194 for coaction with the cam faces of studs 195 projecting downwardly from the displaceable track sections 187. The third plate of each set carries corresponding cams 196 laterally displaced from the paths of travel of the cams 194. With the parts in the position of Fig. 6, cams 194 are just about to act on the studs 195 to elevate the track section 187, a bar having just been cut. During the elevation of the displaceable track section to the limiting position as shown in Fig. 12 the lever 189 and lever 188 swing in counterclockwise direction and the lower end of push bar 193 is moved downwardly as an incident of the elevation of the track section.

If the track section drops back into place by gravity, as soon as the stud 195 rides off cam 194, this raises the push rod 193 out of the path of the cam 196, but if the track does not drop the cam 196 will immediately engage the push bar 193 and act through the lever 189 to force the track section back into place. By having the cam 196 out of the plane of the stud 195 and the cam 194 out of the plane of the end of the push bar 193, the two cams act independently on different parts.

Figure 11:
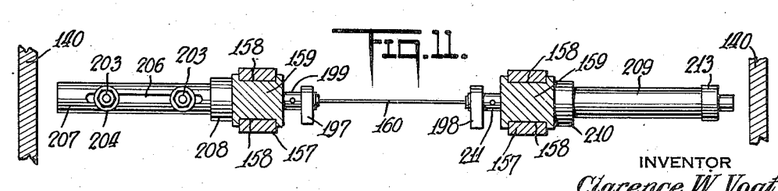
Fig. 11 is a transverse sectional view on the line 11—11 of Fig. 10.

The structural details of a preferred form of the cutter mechanism are shown in Figs. 10 and 11. The cutter 160 which is in the nature of an extremely fine saw blade is preferably brought to a knife edge in order to cut rather than saw the product or material as it passes through the same. It is obvious that saw teeth of any appreciable width would likely cause a deposition of some of the material from the saw knife onto the surface of the comestible which would be objectionable. The blade has its ends secured in clamp members 197. Clamp 197 is fixed as by cotter pins 199 to the inner end of a horizontal rod 198 slidably guided in a transverse opening 199a in one of the blocks 159. A pair of spaced vertical stud shafts 201 extends through the rod 198 and carry rollers 202 at their lower ends. Their upper ends have nuts 203 and washers 204 to clamp collars 205 against the outer face of a bearing sleeve 200. The collars 205 are disposed in longitudinal seats 206 in an outer sleeve 207 which encircles the sleeve 200 and is mounted in a socket 208 in the outer face of the block 159. The slots in the rigid sleeve 207 permit reciprocation of the rod or bar 198, prevent rotation of it, and retain the roller spindles in vertical position.

On the opposite block 159 a sleeve 209 is secured in a socket 210 corresponding with socket 208. Clamp 197 is carried by a rod 211 corresponding to the rod 198 and sliding in its block 159. A cutter tensioning spring 214 encircles the rod 211 between a collar 212 and the bottom of the socket 210, the rod at its outer end being guided by a cap 213. During the main portion of the travel of the cutter it is not reciprocated, but during the travel of the rollers 162 down the inclined portion 166 of the trackway 163 the saw 160 is rapidly reciprocated, the driving means engaging between the pair of rollers 202 and bodily moving the rod 198 back and forth. The spring 214 is alternately compressed and expanded to keep the cutter taut.

Figure 8:
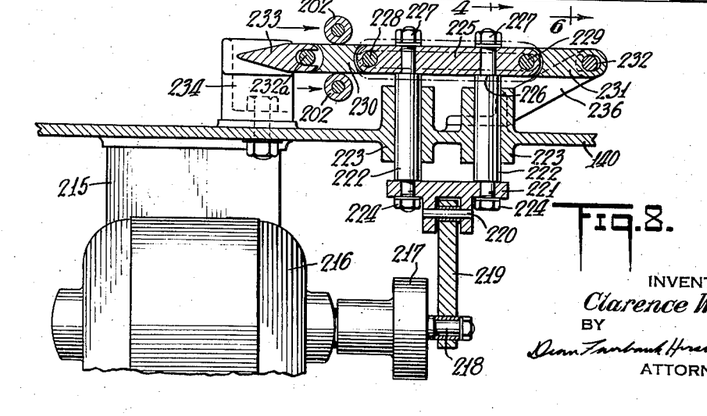
Fig. 8 is a sectional plan view on the line 8—8 of Fig. 5.
Figure 9:
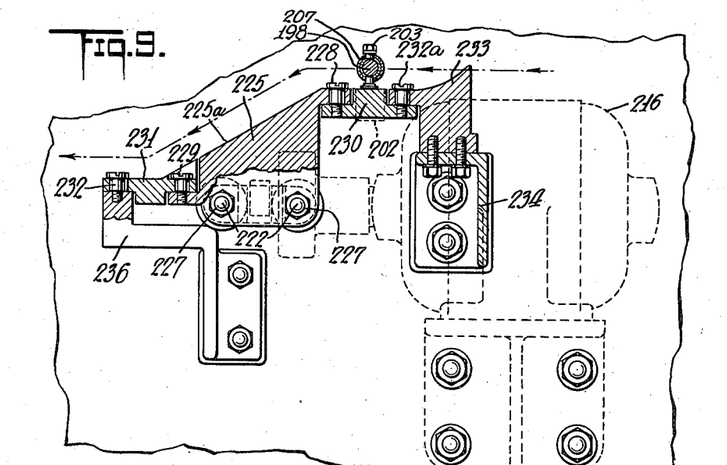
Fig. 9 is a vertical sectional view on the line 9—9 of Fig. 5.

The mechanism with which the rollers 202 engage along a short part of their path and whereby the cutter is reciprocated during its downward movement along the track section 166, is illustrated in sectional plan in Fig. 8 in longitudinal vertical section in Fig. 9, in transverse section in Fig. 10, and in end elevation in Fig. 5.

Mounted on a bracket 215 at the outside of one of the frames 140 is an electric motor 216 having a crank disc 217 upon which is eccentrically mounted a crank pin 218 (Figs. 5 and 8). A link or pitman 219 pivoted at one end on the crank pin has a pivotal connection 220 at its opposite end with a cross head 221. The latter is secured by nuts 224 or in any other suitable manner to a pair of slide rods 222 supported in bearing sleeves 223 in the frame 140. A cross bar 225 is secured on the opposite reduced threaded ends of the guide rods 222 and between shoulders 226 and nuts 227.

The ends of the cross bar 225 are pivotally connected at 228 and 229 respectively to a pair of links 230 and 231, the opposite ends of which are loosely mounted upon fixed pins 232 and 232a to provide for the necessary longitudinal movement of the links as they are oscillated by the reciprocating cross bar 225.

The rollers are guided into straddling relationship with the oscillating link 230 by the fixed pointed guide member 233 supported by a bracket 234 secured to the inner face of plate 140. A second bracket 236 fixed to the inner face of this plate carries the pivot stud 232 for the link 231. The bar 225 has a downwardly inclined upper surface 225a corresponding to the downward inclination 166 of the cam track 163 so that as the saw moves down the track portion 166 the bar 198 will move over the bar 225 parallel to the inclined surface 225a and the rollers 202 will remain in engagement with the opposite sides of the bar 225 along the full length of the latter. The reciprocation of the cutter will begin when the rollers 202 begin to move along the link 230 and the range of movement will increase until the rollers reach the cross bar 225. The range remains constant until the rollers reach the link 231 and decreases to the end of said link. The cutter then stops reciprocating.

While the operation of the mechanism will be in large measure self-evident from the foregoing description, such operation may be briefly summarized as follows:

The plastic filled tube is sufficiently stiff to bridge from the end of the conveyor to a point where it is engaged by the first clamp defined by two of the sections 180 of two opposed bell cranks. This sectional clamp or support closes about the plastic filled tube as the bell crank rollers travel down the incline 185 so that a section to be cut is supported (Fig. 4) by the trailing sectional clamp of one plate set and the leading sectional clamp of a second plate set before the saw comes into operation. With the bar resting within the two sectional clamps, the rollers 162 of the cutter carrying slide 159 enter the inclined portions 166 of the cam tracks 163 and at the same time the rollers 202 which have already straddled the link 230 and are being slightly vibrated, move on to the reciprocating cross piece 225. At this time the saw carriage and the bar holding clamps are moving in the same direction and at the same rate of speed as the bar to be cut, and while such movement continues the reciprocating cutter 166 moves downwardly severing the bar.

While the saw is still in its lowermost position, that is while the rollers 162 are traveling in the track portion 167, track section 187 is raised to open both of the sectional clamps which have been holding the cut bar and at the same time draw the cut off section of the bar sufficiently forwardly so that its rear end clears the cutter and the bar drops onto the carry off conveyor 181 without any wiping engagement with the blade.

Having advanced and dropped the bar, the two sectional clamps temporarily reclose and remain in closed position until they are again opened by moving the bell crank rollers inwardly toward the sprocket wheel shaft 146 as these rollers travel downwardly around this sprocket. This is accomplished by the eccentric placement of this track with respect to the sprocket shaft 146, as is clearly shown in Fig. 6. The sectional clamps remain open as they span the oncoming bar 131 and remain open until they reach the track section 185 and as they pass down this curve the bell crank rollers move downwardly, thus closing the crank arms around the tube. The saw carrying blocks are moved inwardly toward the bars 154 as the rollers 162 travel up the inclined portion 168 of the track 163, the saw remaining in this position until such time as it is again positively moved outwardly and downwardly by the engagement of the rollers with the track section 166. Due to the fact that plates 154 are spaced at sufficiently close intervals, no appreciable sag occurs in the lower run of the sprocket chain 148.

Before the initiation of each cut, the cutters have started to reciprocate, this reciprocation obtaining its greatest range during the time that the actual cut is made. The fine nature of the blades and the relatively rapid and short reciprocating movement which is imparted to them during cutting precludes the possibility of tearing the wrapper or mashing the enwrapped plastic material or squeezing plastic material out of the wrapper tube during the cutting operation.

Figure 5A:
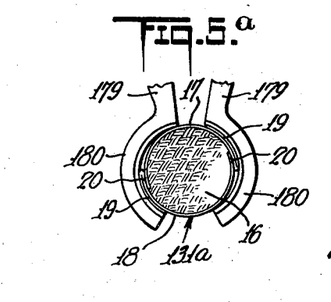
Fig. 5a is an enlarged sectional detail showing how the wrapper flaps are folded in by the clamps during cutting of the bar.

There is no likelihood of the cutter catching and tearing the flaps 14 or 19 as the case may be, of bar 131 or 131a since as the clamps 180 engage the bar, they operate to fold these tabs inwardly against the sides of the bar as is clearly apparent from Fig. 5a, and since the bar is embraced by two clamps, one at each side of the cutter, the tabs will not be free to yield appreciably as the saw goes through.

If the bars consist of partially frozen ice cream they may be conveniently passed to a hardening room by a conveyor B and after the cream has been thoroughly hardened, they may be subsequently sub-divided into individual service portions of ice cream. By suitably spacing the cutters and by a suitable arrangement of supporting clamps it will be apparent that bars of much greater length may be cut and I also contemplate a similar arrangement of cutter mechanism for severing bars into much shorter lengths, typically into enwrapped one pint sections of ice cream.

Figure 13:
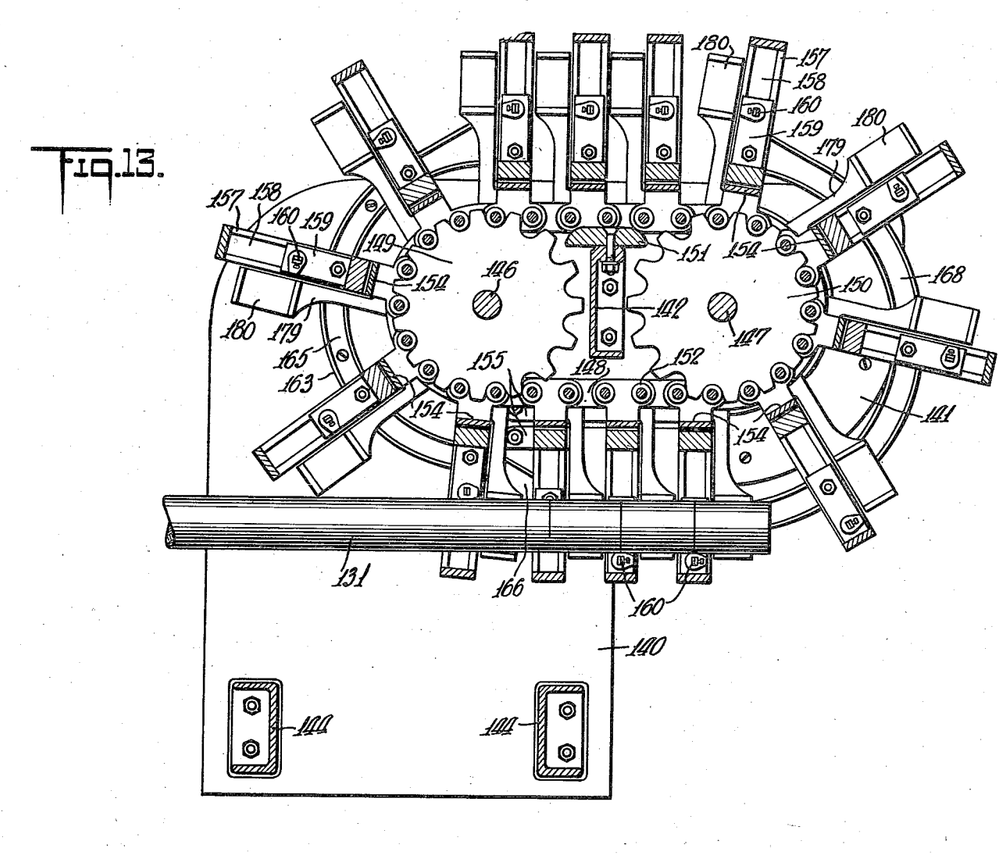
Fig. 13 is a view generally similar to Fig. 15 but illustrating a modified cutter mechanism for cutting short lengths of material.

Such a mechanism is illustrated in Fig. 13 and since it corresponds in all material respects with the cutter mechanism above described, save for the relative positioning of clamps and cutters, similar reference numerals have been used to designate similar parts. With this form of the invention the cutters are spaced quite close together and one sectional bar clamp is arranged between each pair of cutters. Thus the plastic bar is gripped by two clamps arranged immediately adjacent each side of the cutter carrier during each cutting operation, the clamp which is the trailing one during one cutting operation serving as the leading clamp during the next moving operation.

It is worthy of note that where it proves desirable, the cutter mechanism and if desired the conveyor which delivers the bars to the cutter, may be arranged in the hardening room where the prevailing low temperature will case harden the plastic material before severance by the cutter mechanism, thereby further minimizing the danger of smearing the plastic material during cutting.

Figure 4:
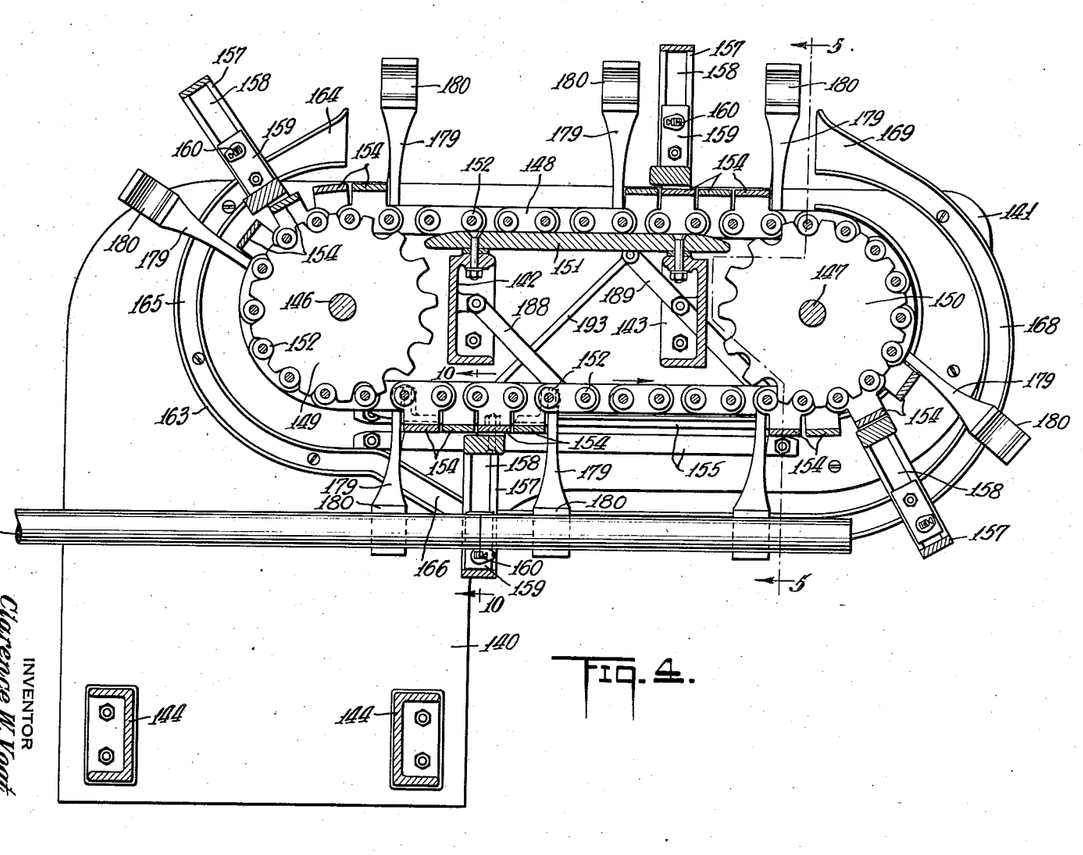
Fig. 4 is a longitudinal sectional view through the cutter mechanism taken approximately on the line 4—4 of Fig. 5.

It will be noted that the conveyor shown in Fig. 1 includes upper and lower runs which grips the tabs on the bar with the latter extending outwardly in approximately horizontal positions. The supporting members 180 shown particularly in Figs. 4, 5, and 5a are on opposite sides of a vertical plane. It will be evident that if the bar be made with the flaps on the upper and lower sides so as to extend upwardly and downwardly, the conveyor C shown in Fig. 1 might be omitted and the members 180 so formed as to grip the tabs and act as the sole bar advancing means.

Having thus described my invention, what I claim as new and desire to secure by Letters Patent is:—

1. Apparatus for transversely severing lengths from a continuously advanced bar, comprising a conveyor having bar supporting means and cutter carrying means carried thereby and movable in the same direction as the direction of advance of the bar, means for moving the cutters in a plane transverse to the path of travel of the bar during the movement of the cutter carrier with the bar and means for axially reciprocating the cutters in respect to the conveyor during such transverse movement.

2. A cutter mechanism for subdividing into sections a bar movable endwise, including a conveyor having carried thereby a plurality of orbitally movable cutter carriers, and a plurality of orbitally movable support members adapted during movement along a certain portion of their orbit, to receive and support said bar, means operable while the bar is supported for actuating the cutters to move them transversely to the direction of travel of the bar and sever the latter, and means for reciprocating the cutters in respect to said carriers.

3. A cutter mechanism for subdividing into sections an endwise movable bar, including a plurality of orbitally movable fine saws, a plurality of orbitally movable support members adapted during movement along a certain portion of their orbit, to receive and support a continuously advancing bar of material to be cut and means operable while the bar is supported for actuating the saws to move them transversely to the direction of travel of the bar and sever the latter, and means for effecting reciprocation of the saws as they pass through the bars.

4. A cutter mechanism for subdividing into sections an endwise movable bar, including a plurality of orbitally movable cutter carriers, a plurality of orbitally movable support members adapted during a certain portion of their orbit, to receive and support a continuously advancing bar of material to be cut and means operable while the bar is supported for actuating the cutters to move them transversely to the direction of travel of the bar and sever the latter, means for accelerating the movement of certain of the support members just after severance of a length from the bar to advance such length to a point from which it may be laterally displaced without wiping engagement with the cutters or with the bar behind them.

5. A cutter mechanism for intermittently severing lengths from a continuously axially advancing wrapped bar of plastic material comprising an endless conveyor, means carried thereby for supporting the bar, means also carried by said conveyor and operable while said bar is so supported to cut off the leading end thereof and means operative after such length has been cut to advance said supporting means and said length forwardly at an accelerated speed in respect to the conveyor so that it clears the cutter and may be dropped by gravity without wiping against the cutter.

6. Apparatus of the class described including a conveyor mechanism for engaging and advancing a plastic filled paper tube, means beyond said conveyor mechanism for temporarily supporting the end of the filled tube, means for transversely severing lengths of the tube while so supported, means for moving said support means and cutter means at the same speed as the tube in the direction of travel of the means for moving the cutter means transversely through the tube to sever the latter, said support means including separable support elements adapted to be opened to drop a severed length of tube.

7. Apparatus of the class described including a conveyor mechanism for engaging and advancing a plastic filled paper tube, means beyond said conveyor mechanism for temporarily supporting the end of the filled tube, means for transversely severing lengths of the tube while so supported, means for moving said support means and cutter means at the same speed as the tube in the direction of travel of the means for moving the cutter means transversely through the tube to sever the latter, said support means including separable support elements adapted to be opened to drop a severed length of tube, and means for accelerating the motion of said support means just before said cut length of tube is dropped so that the tube may clear the cutting means.

8. Means for receiving and supporting the end of a continuously advancing rod or bar, means for severing a predetermined length from such end, an endless chain travelling at the same rate of speed as the rate at which the bar progresses and mounting said bar support members at intervals therealong, said support members each including complementary generally semi-cylindrical support forming members, means for moving said members together as they reach a position to engage the bar, said cutter mechanism being also carried by the chain and including a frame adapted to straddle the advancing bar, a cutter vertically reciprocable in the frame, means for periodically moving said cutter from its uppermost to its lowermost position to sever the bar while the cutter is advancing with the bar.

9. Means for receiving and supporting the end of a continuously advancing rod or bar, means for severing a predetermined length from such end, an endless chain travelling at the same rate of speed as the rate at which the bar progresses and mounting said bar support members at intervals therealong, said support members each including complementary generally semi-cylindrical support forming members, means for moving said members together as they reach a position to engage the bar, said cutter mechanism being also carried by the chain and including a frame adapted to straddle the advancing bar, a cutter vertically reciprocable in the frame, means for periodically moving said cutter from its uppermost to its lowermost position to sever the bar while the cutter is advancing with the bar and means for transversely reciprocating the cutter during such cutting operation.

10. Means for receiving a continuously formed rod or bar, supporting the end of the bar while a predetermined length of such end is severed and for gravitationally discharging the cut length, said means including an endless chain travelling at the same rate of speed as the rate at which the bar progresses, bar support members arranged at intervals along said chain and each including complementary generally semi-cylindrical support forming members, means for moving said members together as they reach a position to engage the bar, a cutter mechanism carried by the chain and including a frame adapted to straddle the advancing bar, a cutter vertically reciprocable in the frame, means for periodically moving said cutter from its uppermost to its lowermost position to sever the bar while the cutter is advancing with the bar and means for opening the bar support members to permit a cut bar to drop.

11. Means for receiving a continuously formed rod or bar supporting the end of the bar while a predetermined length of such end is severed and for gravitationally discharging the cut length, said means including an endless chain travelling at the same rate of speed as the rate at which the bar progresses, bar support members arranged at intervals along said chain and each including complementary generally semi-cylindrical support forming members, means for moving said members together as they reach a position to engage the bar, a cutter mechanism carried by the chain and including a frame adapted to straddle the advancing bar, a cutter vertically reciprocable in the frame, means for perodically moving said cutter from its uppermost to its lowermost position to sever the bar while the cutter is advancing with the bar and means for opening the bar support members to permit a cut bar to drop and means for accelerating the forward movement to the support members as an incident of opening the latter, whereby the bar is shifted forwardly a sufficient distance to prevent a wiping engagement of the severed end of the cutter as such end drops.

12. In a machine of the class described, means for continuously advancing a bar of enwrapped plastic material having a projecting tab to be gripped by said advancing means, means for severing lengths from the bar, support means associated with said severing means and adapted to move with said severing means in the same direction as the bar and at the same rate of speed as the bar while supporting the latter during severing, said support means being operable to fold the tab inwardly against the bar whereby it will not become torn by the severing means during a severing operation.

13. In a machine of the class described, means for continuously advancing a bar of enwrapped plastic material having a projecting tab to be gripped by said advancing means, means for severing lengths from the bar, support means associated with said severing means and adapted to move with said severing means in the same direction as the bar and at the same rate of speed as the bar while supporting the latter during severing, said support means being operable to fold the tab inwardly against the bar whereby it will not become torn by the severing means during a severing operation, said support means including a sectional clamping element movable laterally into engagement with the bar and acting to flatten the tab against the bar prior to the cutting operation.

14. An apparatus for cutting into sections a bar continuously advancing endwise in a substantially straight line, including an orbitally movable cutter carrier, saws carried thereby and movable laterally in one direction in respect to the path of movement of said bar to effect feeding movement of the saws through the bar, and means for axially reciprocating the saws in respect to the cutter during such lateral movement to effect the cutting operation.

15. An apparatus for cutting into sections a bar continuously advancing endwise, including an endless series of bar supports and bar cutter supports, means for continuously moving them in succession along a predetermined endless path, a portion of said path substantially coinciding with the path of movement of the bar to be cut, means for causing said bar supports to engage said bar to support the latter during movement along a portion of said path, saws carried by cutter supports, and means for causing said saws to move transversely of the path of movement of said bar and in respect to said cutter supports during movement along a portion of said endless path.

16. An apparatus for cutting into sections a bar continuously advancing endwise, including an endless series of operating elements, means for continuously moving them in succession along a predetermined endless path, a portion of said path substantially coinciding with the path of movement of the bar to be cut, means for causing certain of said elements to engage said bar to support the latter during movement along a portion of said path, saws carried by other of said elements, means for causing said saws to move transversely of the path of movement of said bar during movement along a portion of said endless path, and means for causing said saws to reciprocate only during said transverse movement.

17. An apparatus for cutting into sections a bar continuously advancing endwise, including an endless conveyor, a plurality of saw carriers secured thereto, a saw mounted in each carrier, means for moving said saw laterally in respect to its carrier during movement of the carrier along a portion only of the path of said conveyor, and means mounted adjacent to a portion only of the path of movement of said saw carriers for causing reciprocation of said saws while in said portion of said path.

18. An apparatus for cutting into sections a bar continuously advancing endwise, including an endless carrier having a run substantially parallel to the path of movement of said bar, a plurality of pairs of clamping elements carried by said carrier, means for moving the two elements of each pair in respect to each other to cause engagement of said bar when said elements reach a point in their path of movement, means for effecting a second relative movement of said elements at another point in their path of movement to disengage said bar, and means for effecting severing of the bar during its endwise movement between said points.

19. An apparatus for subdividing bars continuously advanced endwise, which includes an endless conveyor, a plurality of saws carried by said conveyor, means for moving each saw transversely of the path of said bars and in respect to said conveyor during movement of the saw along a predetermined portion of its orbital path, and means for reciprocating said saw in respect to said conveyor during at least a portion of said first mentioned movement.

CLARENCE W. VOGT.